United States Patent [19]

Macemon

[11] 4,059,329
[45] Nov. 22, 1977

[54] DOUBLE BUSHING WELL WITH CANTILEVER LOAD SUPPORTING LEGS

[75] Inventor: Herbert J. Macemon, Versailles, Ky.
[73] Assignee: Kuhlman Corporation, Troy, Mich.
[21] Appl. No.: 648,635
[22] Filed: Jan. 13, 1976
[51] Int. Cl.² .......................................... H01R 13/50
[52] U.S. Cl. .............................. 339/60 R; 339/94 A; 339/218 R
[58] Field of Search ................. 339/94, 126, 156, 157, 339/218, 59–61; 174/152 R, 153 R, 18

[56] References Cited
U.S. PATENT DOCUMENTS

| | | | |
|---|---|---|---|
| 2,564,181 | 8/1951 | Van Ryan | 174/152 R |
| 2,770,669 | 11/1956 | Smith | 174/152 R |
| 3,054,850 | 9/1962 | Dulude | 174/152 R |
| 3,073,891 | 1/1963 | Barengoltz | 174/152 R |
| 3,422,392 | 1/1969 | Woods | 339/94 A |
| 3,509,516 | 4/1970 | Phillips | 174/18 |
| 3,617,986 | 11/1971 | Becker et al. | 339/94 A |

FOREIGN PATENT DOCUMENTS 37,998   1/1914   Sweden ...................... 174/152 R

*Primary Examiner*—Joseph H. McGlynn
*Attorney, Agent, or Firm*—Harness, Dickey & Pierce

[57] ABSTRACT

A bushing well assembly for an electrical apparatus enclosure having a first conductor portion disclosed on a first axis and extending interiorly of the enclosure for connection to the electrical apparatus, at least two other conductor portions disposed on respective second and third axes and extending exteriorly of the electrical apparatus enclosure for connection to respective separable terminators, and an insulating housing for supporting the conductor portions with respect to the enclosure having supporting legs integral thereto to relieve the cantilever forces exerted on the bushing well assembly. The housing is also provided with a recess to retain a gasket and limit the compressive forces exerted thereon.

6 Claims, 6 Drawing Figures

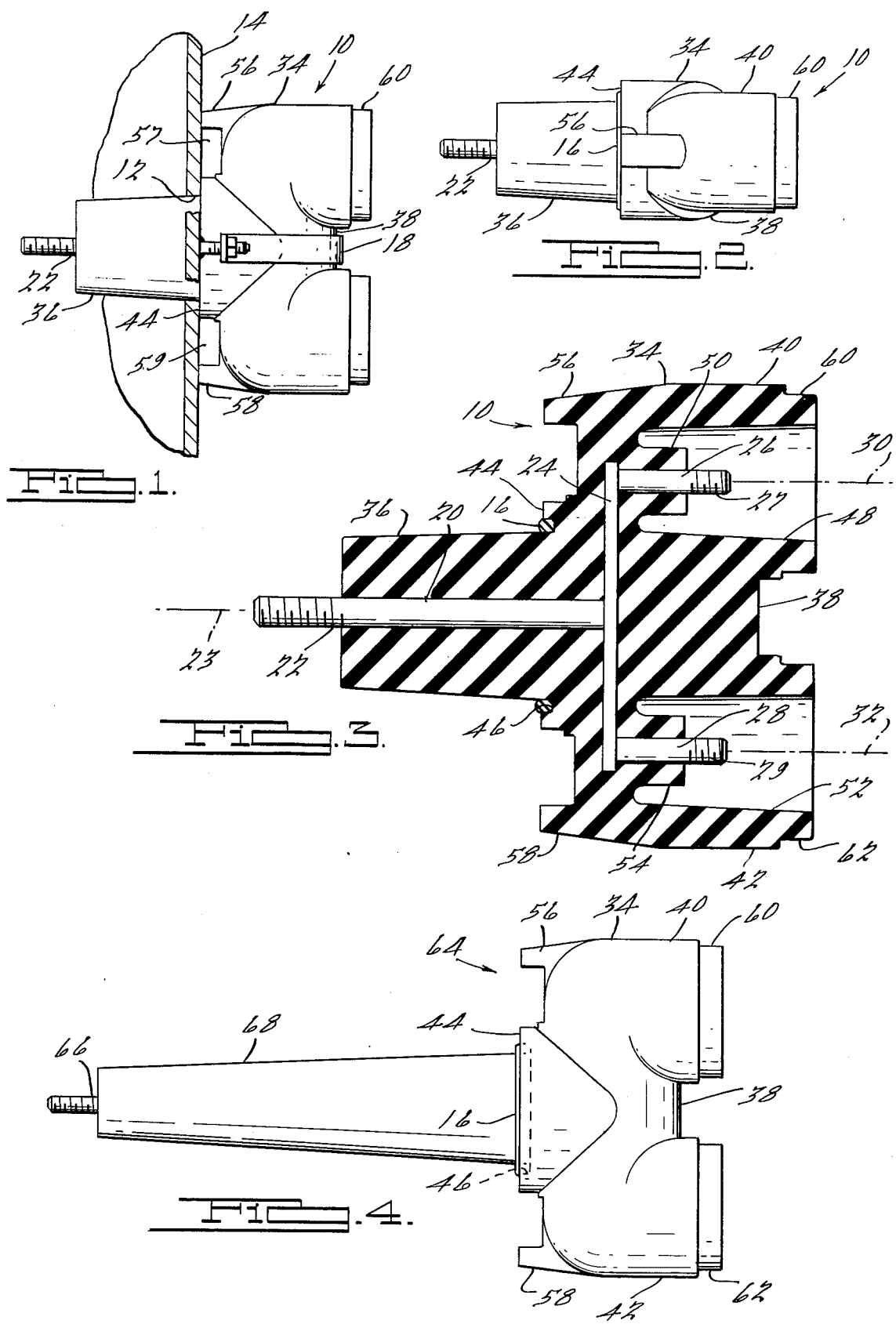

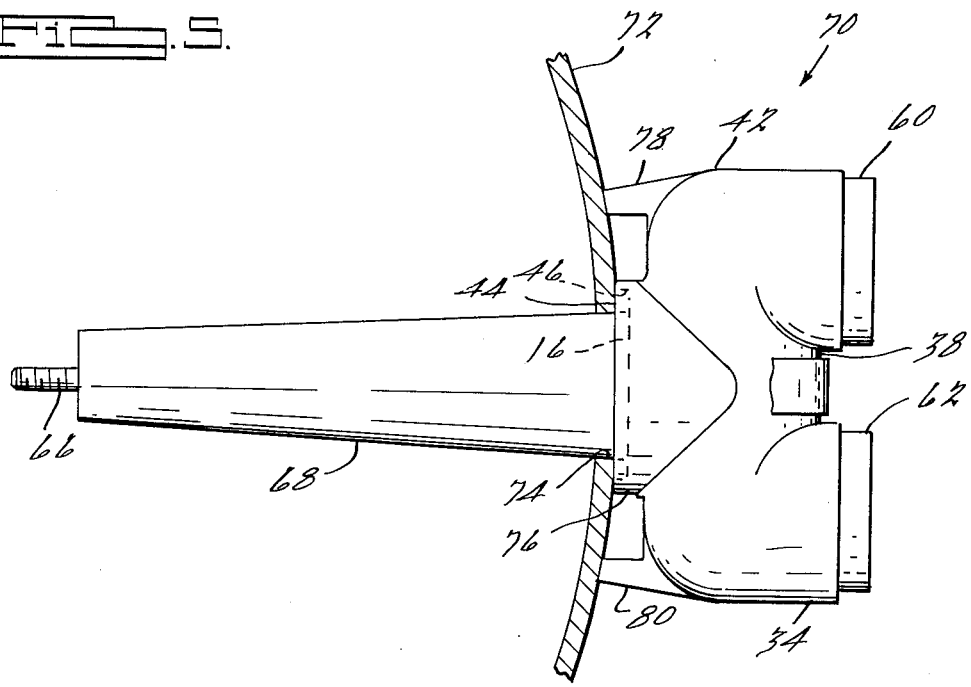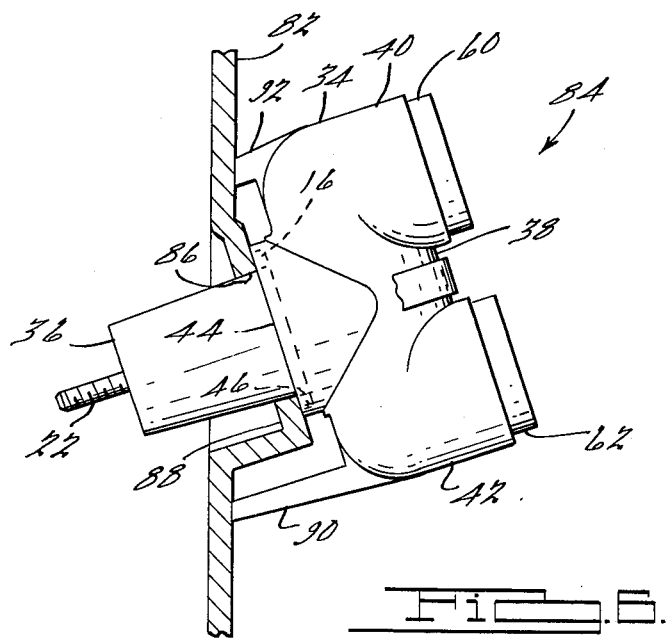

DOUBLE BUSHING WELL WITH CANTILEVER LOAD SUPPORTING LEGS

BACKGROUND AND SUMMARY OF THE INVENTION

The present invention relates to new constructions of bushing wells for electrical apparatus enclosures, and particularly, constructions which provide for feed through capability from one separable terminator to a second separable terminator. The bushing well constructions of the present invention reduce the space requirements for the bushing well and the separable terminator and reduce cantilever loading of the bushing well.

Bushing wells are well known in the art having their primary application in the field of electrical power distribution systems. In such applications, several pieces of electrical apparatus may be connected in parallel to a single feeder line.

Prior to the development of bushing wells, connections to enclosed electrical apparatus, such as transformers, were commonly accomplished by providing an insulated stud passing through the enclosure to which a spade terminal was secured. Incoming and outgoing cables were then bolted directly to the exposed spade terminals which may then have been wrapped with an insulating material. Making and breaking these electrical connections is extremely costly and time consuming. This "live front" design is unsatisfactory from a safety standpoint also as lineman may accidently come into contact with the exposed line connector. As the useful life of such electrical equipment is relatively long, many of these "live front" designs are still in use. Accordingly, it is desirable to adapt these "live front" units to the "dead front" design using bushing wells. Often, however, space restrictions prohibit the addition of a second opening for a second bushing well. This is particularly true for three phase transformers. Thus, it is desirable to employ a feed through type bushing well. Feed through capability had previously been provided by incorporating two separate bushing wells on the face of the enclosure with a jumper strap electrically connecting them interiorly of the enclosure. As is apparent, such an arrangement is costly to manufacture, both in labor and materials. Further, as two separate openings in the enclosure are required, the possibility of insulating fluid leakage is greatly increased.

More recently, bushing wells have developed which provide feed through capability integral to the bushing well. Such a bushing well is disclosed in the U.S. Pat. to Fisher, No. 3,909,509, issued May 1, 1975, and assigned to the same assignee as the present application.

In use, the electrical connection to bushing wells is normally made by grasping a separable connector with a hot stick and inserting the connector into the bushing well assembly. As a bushing well providing feed through capability must necessarily have connector portions offset from the portion passing through the enclosure wall, such operation of the connector produces a cantilever stress on the bushing well assembly itself. These forces may result in a cracking of the bushing well itself or cause sufficient distortion of the enclosure wall to allow insulating fluid to escape.

The present invention provides a bushing well having feed through capability which overcomes these problems.

The present invention provides lateral supporting legs which engage the enclosure thus substantially relieving the cantilever loading resulting during operation of the connector. Also, as the present invention has integral feed through capability and requires only slightly more space than prior "live front" terminals, it may easily be installed in place thereof.

Further, the present invention provides a means to removably clamp the bushing well to the enclosure thus allowing field replacement without the necessity of replacing the equipment.

Further, means are also provided to limit the clamping pressure exerted on the gasket and also to retain the gasket in position, thus ensuring the most advantageous sealing relationship may be easily obtained even under adverse field conditions and by less highly trained personnel.

A second embodiment of the present invention has an elongated conductor portion extending interiorly of the enclosure a substantially greater distance than that of the interiorly extending conductor portion of the first embodiment. This elongated shank is particularly suited for application in which the bushing well is mounted on the top of the enclosure as its extended shank allows the lead connections to be made below the level of the insulating fluid.

These and other advantages and features of the invention will become apparent from the detailed description of the preferred embodiment below.

BRIEF DESCRIPTION OF THE DRAWINGS

FIG. 1 is a side view of a bushing well according to the present invention shown in relationship to an enclosure housing;

FIG. 2 is a view of the present invention as seen from the top of FIG. 1;

FIG. 3 is a sectional view of the present invention;

FIG. 4 is a side view of another embodiment of the present invention;

FIG. 5 is a side view of yet another embodiment of the present invention shown in relationship to a curved top of an enclosure housing; and FIG. 6 is a side view of yet another embodiment of the present invention shown in relationship to a wall of an enclosure having an embossed portion thereon.

DETAILED DESCRIPTION OF THE PREFERRED EMBODIMENTS

In FIGS. 1 through 3, a first embodiment of the bushing well 10 according to the present invention is illustrated. The bushing well 10 is mounted in an opening 12 in the wall 14 of a transformer enclosure. The bushing well 10 is clamped to the wall 14 by a U-shaped bracket 18 which straddles the bushing well 10. Ordinarily, the transformer enclosure 14 will contain oil or some other insulating fluid so that a fluid seal between the bushing well 10 and the wall 14 is provided through the means of a gasket 16 as described below.

The bushing 10 has a conductor 20 with a first portion 22 which extends into the transformer enclosure along an axis 23 which is generally perpendicular to the plane of the wall 14. The first conductor portion 22 is provided with a threaded end inside of the enclosure for connection to a cable which, in turn, is connected to the transformer coil or other electrical apparatus. The conductor 20 has a main conductor porton 24 exteriorly of the transformer enclosure and which is generally aligned parallel to the plane of the wall 14. The conductor 20 has a second conductor portion 26 which extends outward from one end of conductor portion 24 and is disposed on an axis 30 which is parallel with, but laterally displaced, from the axis 23.

Conductor 20 has a third conductor portion 28 which extends outward from the opposite end of conductor portion 24 and is disposed on an axis 32 which is parallel to axes 30 and 23 but laterally displaced from each of them.

Second and third conductor portions are each provided with threaded ends 27 and 29 for connection to a separate bushing well insert.

The loop feed bushing assembly 10 has a housing 34 of insulating material which is preferably cast about the conductor 20. The housing 34 includes a generally cylindrical first portion 36 which is slightly tapered toward the threaded end of the conductor portion 22 and is coaxial with the conductor portion 22, a main body portion 38 also generally cylindrical, is coaxial with respect to the conductor 24, a second generally cylindrical portion 40 is coaxial with respect to the second conductor portion 26 and a third generally cylindrical portion 42 is coaxial with respect to conductor 28. The second and third housing portions, 40 and 42, each smoothly merge into opposite ends of main body portion 38 as seen in FIG. 1, thus creating a generally U-shaped, cylindrical form. In like manner, first cylindrical portion 36 smoothly merges into the main body cylindrical portion 38 approximately midway between portions 40 and 42. Cylindrical portion 36 has an annular shoulder 44 formed near its merger with portion 38. An annular groove 46 is formed in the shoulder into which a gasket 16 is placed. Gasket 16 may have a round or rectangular cross section but a round cross section or O-ring type is preferred. Groove 46 has a width substantially equal to the cross-sectional diameter of O-ring gasket 16 and a depth such that when shoulder 44 engages wall 14, the cross-sectional diameter of gasket 16 will be reduced by approximately 30% in the direction of compression.

As can be best seen in FIG. 3, the housing portion 40 has an inwardly tapering coaxial bore 48 which terminates at a coaxial cylindrical projection 50, the conductor portion 26 has a threaded end 27 which projects from the cylindrical projection 50 to permit its connection to an insulated separable connector insert to be described. The housing portion 42 has an inwardly tapering coaxial bore 52 which termintes at a coaxial cylindrical projection 54. The conductor portion 28 has a threaded end 29 which protrudes from the cylindrical projection 54 to permit its connection to an insulated separable connector insert as will also be described. Cylindrical housing portion 40 has a leg 56 integrally formed thereon which extends longitudinally toward wall 14 as shown in FIG. 1. Similarly, housing portion 42 has a leg 58 integrally formed thereon and extending longitudinally toward wall 14. Legs 56 and 58 are disposed on housing portions 40 and 42 at the respective laterally outer and longitudinally inner extremes and are of a length such that they both contact wall 14 when bushing 10 is fully clamped with shoulder 44 engaging wall 14, thus legs 56 and 58 provide lateral support to bushing 10 and relieve the cantilevered forces exerted on shoulder 44. Shoulder 44 and legs 56 and 58 are formed so as to provide openings 57 and 59 below main body housing portion 38 and between the respective legs and first housing portion 36. These openings allow the present invention to be easily adapted to a variety of clamping arrangements as well as to allow its use in conjunction with other accessories such as the bushing well fuse holder as described in the copending application of Herbert J. Macemon, Vance Martin and John L. Fisher, Ser. No. 500,584 and assigned to the same assignee as this application. It should be noted that, while FIGS. 1 and 3 show legs of a length such that the ends thereof are in the same plane as that defined by shoulder 44, they may also each extend an equal distance beyond this plane so as to provide like support when the bushing is mounted on a curved surface such as a cover of a pole-type transformer. Such an embodiment is shown in FIG. 5 and described in greater detail below. Also, the legs may be of an unequal length, thus allowing mounting on a surface which is inclined relative to the axis 23 of the bushing. This embodiment of the present invention is shown a FIG. 6 and described in greater detail below. In such an application, a surface are around opening 12 and equal to the outer diameter of shoulder 44 would need to be embossed on the inclined wall so as to be perpendicular to axis 23, thus providing a proper sealing surface for gasket 16. Such embossings are commonly provided on existing low profile pad mounted transformers employing single bushing well assemblies, thus allowing the separable connector to be inserted by a person in a normal standing position. In all of the embodiments herein disclosed, the exterior of the housing 34 is preferably coated with an electrically conductive coating so as to carry the ground potential at the wall 14 to the separable terminators.

In connecting conductor portion 26 to a power supply, a bushing well insert is first placed in bore 48. This insert is then threaded onto conductor portion 27. This insert is designed to receive a separable connector secured to a power cable. As both bushing well inserts and separable connectors are well known in the art, a more detailed description thereof is not believed necessary.

Cylindrical housing portion 40 has a reduced outside diameter portion 60 at the end in which coaxial bore 48 is disposed. The separable connector insert has an internal structure so as to slip over the reduced diameter portion thus forming a baffle arrangement to seal out moisture and the like.

The separable connector insert has a grooved portion which engages reduced diameter portion 60 so as to create a baffle arrangement to seal out dirt, moisture and the like. Similarly, cylindrical housing portion 42 has a reduced outside diameter portion 62 at the end in which coaxial bore 52 is disposed which is likewise engaged by a grooved portion of a separable connector.

In FIG. 4, another embodiment of a bushing well assembly in accordance with the present invention is illustrated, generally at 64. Bushing well 64 has an elongated conductor portion 66 extending interiorly of the transformer, a main body conductor portion extending parallel to the plane of the wall, and a second and third conductor portions extending outward from opposite ends of the main body conductor portion. Main body, second and third conductor portions are the same as those shown in FIG. 3 and described above. Further, like portions are indicated by like reference numerals and further description of them is omitted, The elongated conductor portion has an elongated housing portion 68 extending coaxial therewith and formed of an insulating material. This elongated housing portion 68 also smoothly merges into the central housing portion 38 at a point midway between the ends thereof as seen in FIG. 4 and similarly to that described above for bushing well 10. Also, similarly to bushing well 10, elongated housing portion 68 has an annular shoulder 44 formed thereon near its point of merger with main body housing portion 38. Shoulder 44 further has an annular groove 46 disposed thereon for retaining a gasket 16 such as an O-ring type as previously described. As the sealing means, lateral legs supporting structure, and internal bore construction for this embodiment of the bushing well are the same as that described with reference to FIGS. 1 through 3, repetition thereof is believed unnecessary.

The second embodiment of the present invention having an elongated portion extending interiorly of the transformer makes it particularly suitable for conversion of "live front" pole-type transformers to the newer "dead front" design. In such application, the bushing well assembly is mounted on the top of the transformer and, thus, the extended portion is necessary in order to insure that the internal connection is located below the oil level. This second embodiment would also be suitable for direct burial transformers commonly having bushing assemblies disposed on the tops thereof and having similar requirements to those of the pole-type transformers with regard to oil level.

A third embodiment of the present invention is shown at 70 in FIG. 5 in relation to a curved portion 72 of an electrical apparatus enclosure, such as a cover for a pole-type transformer or the like. Curved portion 72 has an aperture 74 therein and a flat embossed portion 76 surrounding said aperture. Flat surface 76 has a diameter equal to the outside diameter of shoulder 44 and provides a seat for gasket 16 and shoulder 44, thereby sealing bushing well 70 to curved portion 72. Bushing well 70 is identical to that of FIG. 4 with the exception that legs 78 and 80 are longer than legs 56 and 58 extending an equal distance beyond the plane defined by shoulder 44. Legs 78 and 80 are of such a length as to engage curved portion 72 simultaneously with shoulder 44, thus providing lateral support against the aforementioned cantilevered stresses. The other portions of bushing well 70 are identical to those previously described, are indicated by like numbers, and further description thereof is believed unnecessarily repetitious.

Yet another embodiment of the present invention is shown at 84 of FIG. 6 installed on a wall 82 of an electrical apparatus enclosure. Wall 82 has an aperture 86 and an embossed portion 88 surrounding the aperture. The embossed portion 88 is sufficiently large so as to form a flat surface to be engaged by shoulder 44 and gasket 16, thus creating the sealing relationship. Bushing well 84 also has lateral leg supports 90 and 92; both of which engage wall 82. A longitudinal axis of bushing well 84 is inclined relative to the vertical axis of wall 82, thus requiring leg 92 to be substantially shorter than leg 90. The specific lengths of legs 92 and 90 will be determined by the angle at which the embossed portion 88 is set relative to wall 82; that is to say, the greater the angular deflection of the embossed portion, the greater the difference between the lengths of legs 90 and 92. The remaining portions of bushing well 84 are identical to, and indicated by, like numbers as those previously described above.

In view of the above, it will be appreciated that new bushing well constructions are disclosed which allow for feed through capability of the incoming line; for example, to a second transformer or other electrical apparatus. Moreover, it will be appreciated that these constructions minimize the overall projection of the bushing well, bushing insert, and separable terminator assembly so that these bushing wells may be used with existing transformer enclosures which may have limited space for such assemblies. Furthermore, it will be appreciated that the bushing well construction of the present invention advantageously minimizes the cantilever stresses on the bushing well through the agency of the legs provided thereon.

It is to be understood that the foregoing description is that of preferred embodiments of the invention. Various changes and modifications may be made by one skilled in the art without departing from the spirit and scope of the invention as defined by the appended claims.

What is claimed is:

1. For a transformer having an enclosure, a bushing well comprising:
   conductor means having a first portion extending into said transformer enclosure, second and third portions extending away from said transformer enclosure, said first, second and third conductor portions being substantially parallel and spaced apart, and a portion interconnecting said first, second and third conductor portions;
   insulating means surrounding and supporting said conductor means;
   a first leg disposed adjacent to and laterally outboard from said second conductor portion and extending toward said transformer enclosure;
   a second leg disposed adjacent to and laterally outboard said third conductor portion and extending toward said transformer enclosure;
   an annular shoulder surrounding said first conductor portion; and
   said first and second legs extending beyond a plane defined by said shoulder.

2. A bushing well assembly as set forth in claim 1 wherein said first leg is longer than said second leg.

3. For an electrical apparatus enclosure, a bushing well comprising:
   conductor means having a first conductor portion extending into said enclosure for connection to an electrical apparatus, second and third conductor portions spaced apart from and on opposite sides of said first conductor portion, said first, second and third conductor portions all being parallel and coplanar, a fourth conductor member interconnecting said first, second and third conductor portions;
   an insulating housing having first, second, third and fourth portions surrounding and supporting respective conductor portions, said first, second and third housing portions merging smoothly into said fourth housing portion, said insulating housing further including an annular shoulder on said first housing portion disposed about said first conductor portion at a point adjacent said merger with said fourth housing portion, said annular shoulder engaging the outside of said enclosure when said bushing well is clamped thereto with said first housing portion extending into said enclosure;
   a first supporting leg disposed on said housing at the outboard point of merger between said second and fourth housing portions and extending a predetermined length from said housing toward said enclosure for engagement with the outside of said enclosure at a point more distant from said first conductor portion than said engagement of said annular shoulder with the outside of said enclosure, the engagement of said first supporting leg with said enclosure being effective to alleviate cantilever loading of said bushing well by providing opposition to the force applied to said bushing well when a connectable conductor is connected with said first conductor portion;

a second supporting leg disposed on said housing at the outboard point of merger between said third and fourth housing portions and extending a predetermined length from said housing toward said enclosure for engagement with the outside of said enclosure at a point more distant from said first conductor portion than said engagement of said annular shoulder with the outside of said enclosure, the engagement of said second supporting leg with said enclosure being effective to resist cantilever loading of said bushing well by providing opposition to the force applied to said bushing well when a connectable conductor is connected with said first conductor portion; and said bushing well being adapted to be removably secured to said enclosure.

4. A bushing well as set forth in claim 3 further comprising means for creating a sealing relationship between said enclosure and said bushing well; and said bushing well being adapted to be removably secured to said enclosure.

5. A bushing well as set forth in claim 4 wherein said means for creating a sealing relationship comprises:

an annular groove disposed on said shoulder;
resilient gasket means disposed in said groove; and
said gasket means having a thickness relative to the depth of said groove that when said shoulder engages said enclosure, said gasket thickness will be compressed approximately 30%.

6. A bushing well as set forth in claim 5 wherein said length of said legs is such that said legs and said shoulder simultaneously engage said enclosure.

* * * * *